W. B. WREFORD.
LEVER LOCKING DEVICE.
APPLICATION FILED DEC. 13, 1910.

1,025,180.

Patented May 7, 1912.

Witnesses
Frank E. Ernst
Chas. W. Stauffiger.

Inventor
William B. Wreford,
By
Attorneys

UNITED STATES PATENT OFFICE.

WILLIAM B. WREFORD, OF DETROIT, MICHIGAN.

LEVER-LOCKING DEVICE.

1,023,180.
Specification of Letters Patent.
Patented May 7, 1912.

Application filed December 13, 1910. Serial No. 597,038.

*To all whom it may concern:*

Be it known that I, WILLIAM B. WREFORD, a citizen of the United States of America, residing at Detroit, in the county of Wayne and State of Michigan, have invented certain new and useful Improvements in Lever-Locking Devices, of which the following is a specification, reference being had therein to the accompanying drawings.

This invention relates to devices for locking the controlling lever of an automobile against movement by unauthorized persons, and it has for one of its objects the provision of a removable clamp device adapted to be attached to the controlling handle, or treadle of the car.

A further object of the invention resides in the provision of a device of this character which can be readily removed, in the entirety, from the car, so that normally the lever and car will be free from encumbrance.

Further objects of the invention will hereinafter appear, and be defined in the claims.

The invention has been clearly illustrated in the accompanying drawings, in which similar characters denote similar parts, and in which—

Figure 1:
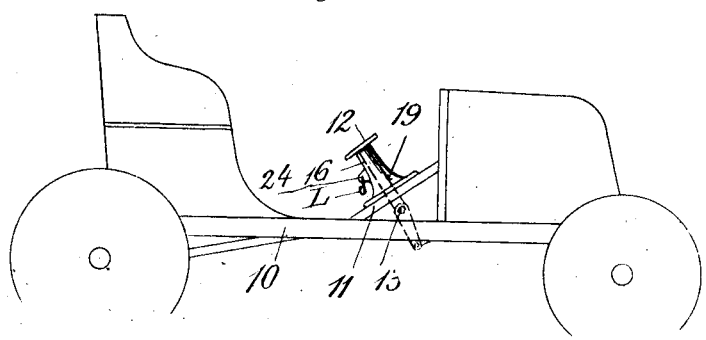
Figure 2:
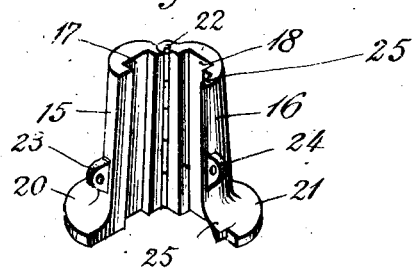
Figure 3:
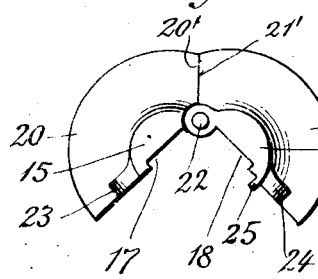
Figure 4:
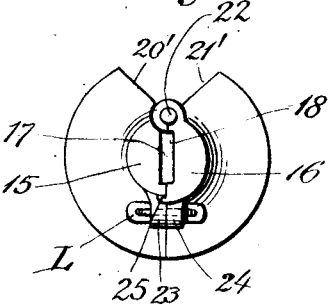

Figure 1 represents a side view of an automobile showing my device applied to a treadle thereof. Fig. 2 shows a perspective view of the locking device, *per se;* Fig. 3 is a top view thereof when open, and Fig. 4 is a similar view of the same when closed.

Referring to the drawings, the numeral 10 denotes the body of an automobile, having a foot-board 11, and a treadle 12 which may be one of the controlling levers of the car, as for instance the clutch-actuator, and is pivoted at 13 below the foot board which is slotted to permit movement of the treadle forward.

My invention has for its object the provision of means whereby the treadle may be locked against movement, and which may be readily applied or removed when desired. The device consists of a two-part clamp comprising a pair of sections 15, 16, which are provided with coacting grooves 17, 18 to fit around the treadle-lever or stem 19. The base portions of the sections are somewhat enlarged, as at 20, 21 to afford a broad footing on the foot-board, and they are hinged together in alinement with the longitudinal axis of the slot-sections laterally as at 22, while at their diametrically opposite sides they are provided with perforated ears 23, 24 adapted to receive the hasp of a pad-lock L, or other fastening device. In order to permit both sections to be swung open, the base-portions 20, 21 are cut-away, as at 20′, 21′ (see Fig. 4.)

Means are provided whereby the device will be safeguarded against being broken open by insertion of an instrument into the joint between the abutting ends of the sections, these means consisting substantially of a lip 25 formed on the outer edge of one of the sections and adapted to overlap the other, and consequently the joint-line when the device is closed.

Inasmuch as the device is adapted to be used in connection with treadle-levers of various sizes of different cars, the openings or notches are of such size as to pass around any of them, while the device may be shortened or cut-off to meet the requirements of height of projection of the treadle above the footboard, the intention being a close fit between the underside of the treadle-plate which constitutes a shoulder on the lever and the top of the footboard, so that when an attempt is made to push the treadle forward or downward, my improved device will be an effective preventive.

I claim:

1. In a device of the character described the combination with a stationary support, and a movable stem having a shoulder, of a sectional post filling the space between said shoulder and the support, each section having a groove coöperative with the groove of the other section to receive and surround said stem, means for hinging said sections together at their adjacent edges on one side thereof, and means for locking the free edges of the sections together.

2. In a device of the character described the combination with a stationary support, and a movable stem having a shoulder, of a two-section post fitting between said shoulder and the support, each section having a groove coöperative with the groove of the other section to receive and surround said stem, means for hinging said sections together at their adjacent edges on one side thereof, means for locking the free edges of the sections together, and means for covering the joint between said sections.

3. In a device of the character described the combination with a stationary support, and a movable stem having a shoulder, of a two-section post filling the space between said shoulder and the support, one of said sections having a longitudinal groove to receive said stem and coöperative with the other section to inclose said stem, said sections being hinged together at one side thereof and having perforated ears at their other sides, and a device passing through said perforations to hold the sections against separation.

In testimony whereof I affix my signature in presence of two witnesses.

WILLIAM B. WREFORD.

Witnesses:
 OTTO F. BARTHEL,
 C. R. STICKNEY.